(12) United States Patent
Bovina et al.

(10) Patent No.: US 7,475,769 B2
(45) Date of Patent: Jan. 13, 2009

(54) DEVICE FOR HANDLING PACKETS

(75) Inventors: Stefano Bovina, Bologna (IT); Luca Cavazza, Bologna (IT); Alessandro Minarelli, Bazzano (IT)

(73) Assignee: G.D. Societa' Per Azioni, Bologna (IT)

( * ) Notice: Subject to any disclaimer, the term of this patent is extended or adjusted under 35 U.S.C. 154(b) by 385 days.

(21) Appl. No.: 11/488,088

(22) Filed: Jul. 18, 2006

(65) Prior Publication Data
US 2007/0045084 A1    Mar. 1, 2007

(30) Foreign Application Priority Data
Jul. 19, 2005    (IT)    ............... BO2005A0479

(51) Int. Cl.
B65G 47/26    (2006.01)
(52) U.S. Cl. ............................. 198/432; 198/597
(58) Field of Classification Search ............ 198/430, 198/432, 433, 597, 598, 418.1
See application file for complete search history.

(56) References Cited

U.S. PATENT DOCUMENTS

| | | | |
|---|---|---|---|
| 1,980,411 A | 11/1934 | Kimball et al. | |
| 3,368,766 A * | 2/1968 | Livingston | 198/433 |
| 3,794,154 A * | 2/1974 | Holt | 198/418.1 |
| 3,795,302 A | 3/1974 | Schoppee | |
| 3,933,236 A * | 1/1976 | Aterianus et al. | 198/418.6 |
| 5,564,554 A * | 10/1996 | Lawrence | 198/432 |
| 5,794,756 A * | 8/1998 | Taylor et al. | 198/429 |
| 6,808,061 B2 * | 10/2004 | Dennert | 198/430 |

FOREIGN PATENT DOCUMENTS

| | | |
|---|---|---|
| EP | 1 457 440 | 9/2004 |
| GB | 2 013 599 | 8/1979 |
| GB | 2 055 734 | 3/1981 |

OTHER PUBLICATIONS

Partial Search Report for corresponding European Application No. 06 11 7374 dated Oct. 27, 2006.

* cited by examiner

Primary Examiner—James R Bidwell
(74) Attorney, Agent, or Firm—Harness Dickey & Pierce, P.L.C.

(57) ABSTRACT

A device for handling packets of cigarettes has two drying beams, each for feeding a line of packets to an intermediate station; and two transfer units, each for transferring the incoming packets from a respective drying beam from the intermediate station to a single output conveyor; the transfer units and the output conveyor are powered by the same motor, and the speed of the drying beams is so regulated that the packets are fed to the intermediate station in phase with the movement of the transfer units.

37 Claims, 5 Drawing Sheets

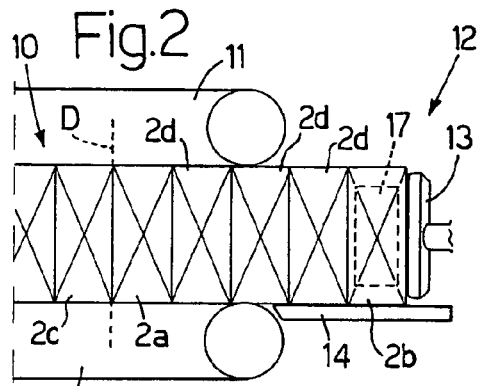
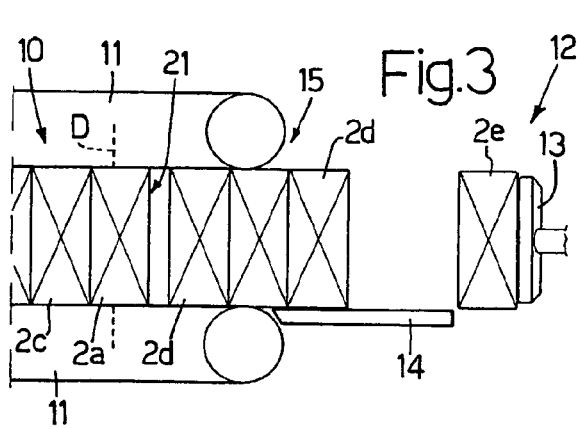
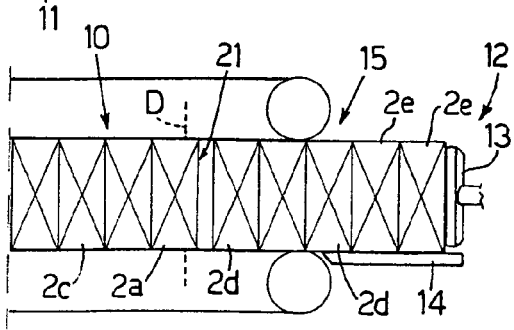
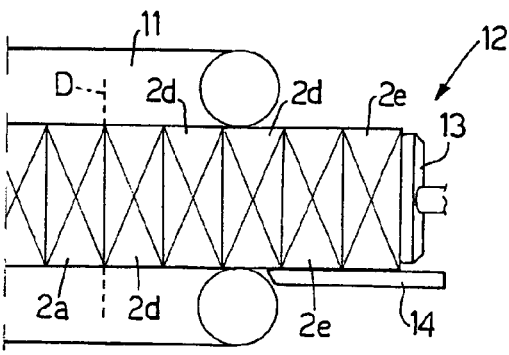

DEVICE FOR HANDLING PACKETS

PRIORITY STATEMENT

This application is based on and claims priority from Italian Patent Application No. BO2005A 000479 filed on Jul. 19, 2005 in the Italian Intellectual Property Office, the disclosure of which is incorporated herein in its entirety by reference.

FIELD OF THE INVENTION

The present invention relates to a device for handling packets.

The present invention may be used to advantage in the packing of cigarettes, to which the following description refers purely by way of example.

More specifically, the present invention relates to a device for handling packets comprising a conveyor assembly for conveying a line of packets.

According to one aspect of the present invention, the conveyor assembly feeds the packets to an intermediate station. The device also comprises a transfer unit; and a support assembly located at the intermediate station to support the packets coming off the conveyor assembly.

BACKGROUND OF THE INVENTION

In actual use, at the intermediate station, the packets coming off the conveyor assembly are pushed to the transfer unit by the line of packets travelling on the conveyor assembly; and the transfer unit transfers the packets coming off the conveyor assembly from an extraction location at the intermediate station to an output conveyor.

Known devices of the type described above are not very versatile, and do not adapt easily to varying production requirements, particularly changes in packet size.

Known devices of the above type are also subject to frequent breakdowns and damage, to the packets as a result of jamming caused by poor coordination of the conveyor assembly and transfer unit.

According to a further aspect of the present invention, the conveyor assembly conveys the line of packets at a given travelling speed in a first direction. The device also comprises a feed unit for feeding a succession of packets to the conveyor assembly in the first direction; in actual use, once fed to the conveyor assembly, the incoming packets form part of the line of packets; and the packets forming part of the line of packets are conveyed by the conveyor assembly.

A drawback of known devices of this type is the possibility of gaps forming between successive packets in the lines of packets moving forward from the input station. As a result, the packets are subject to damage, by being allowed too much freedom of movement, and/or have different structural characteristics as a result of different pressure being exerted on the walls of the packets.

SUMMARY OF THE INVENTION

It is an object of the present invention to provide a device designed to at least partly eliminate the aforementioned drawbacks, and which at the same time is cheap and easy to produce.

According to the present invention, there is provided a device as claimed in the attached claims.

BRIEF DESCRIPTION OF THE DRAWINGS

A non-limiting embodiment of the present invention will be described by way of example with reference to the accompanying drawings, in which:

FIGS. 2 to 7 show side views of a detail of the FIG. 1 device in different operating positions;

DETAILED DESCRIPTION OF THE INVENTION

Figure 1:
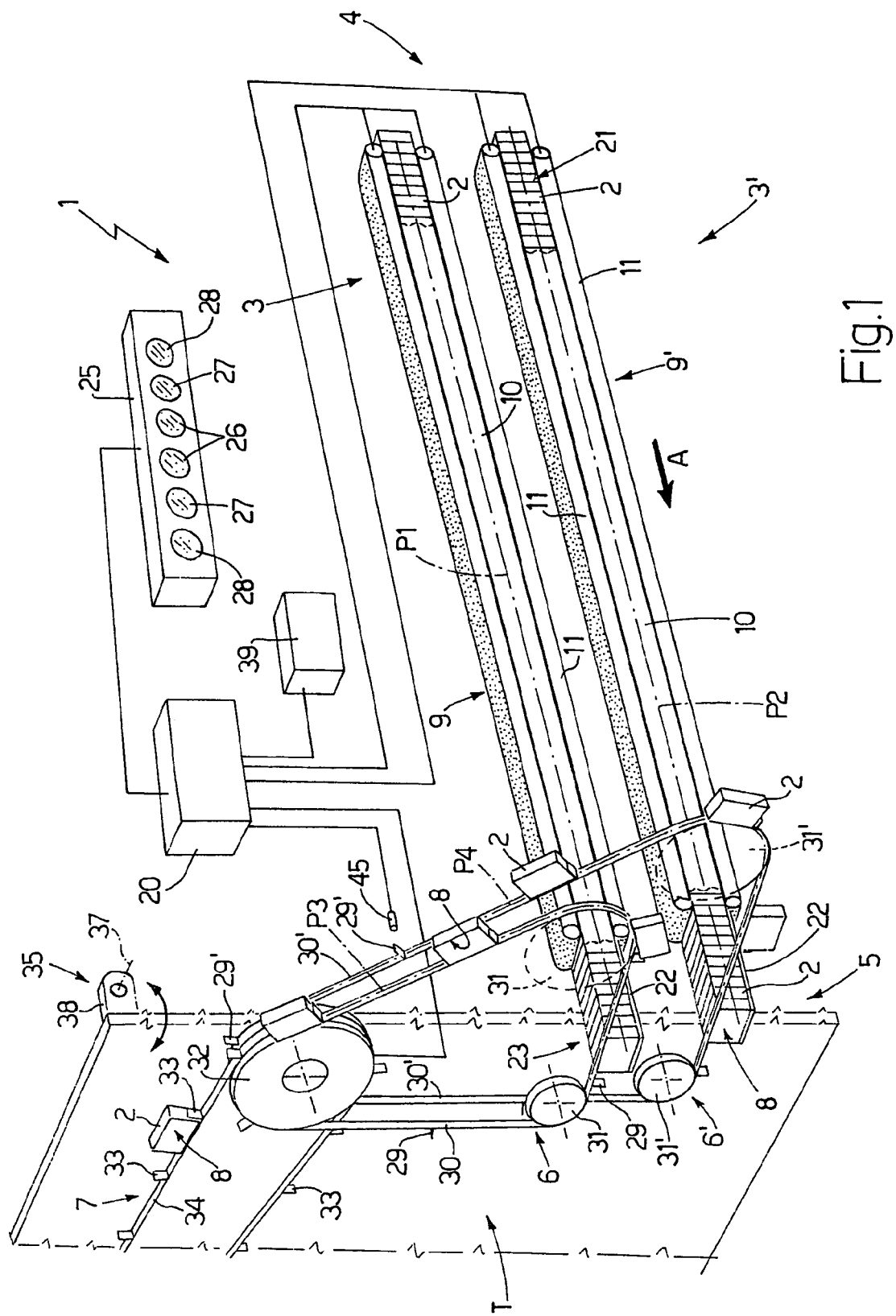
FIG. 1 shows a schematic view in perspective, with parts removed for clarity, of a device in accordance with the present invention.

Number 1 in FIG. 1 indicates as a whole a device for handling packets 2, in particular of cigarettes (not shown).

Device 1 comprises two drying beams 3, 3' for stabilizing and conveying packets 2 from an input station 4 to an intermediate station 5, where two transfer units 6, 6', one for each drying beam 3, 3', pick up and feed packets 2 to a single output conveyor 7.

Each packet 2 is substantially parallelepiped-shaped with two parallel major lateral walls 8 (only one of which is shown in FIG. 1).

More specifically, each drying beam 3, 3' transfers heat to glue (not shown) on packets 2 to dry the glue and stabilize packets 2, and comprises a respective conveyor assembly 9, 9', and a number of heating plates (not shown).

Conveyor assemblies 9, 9' convey respective lines 10 of packets 2 in a direction A along respective paths P1, P2, and each comprise a respective pair of parallel, facing belt conveyors 11, and a respective drive (not shown). Paths P1, P2 are substantially horizontal, and are arranged substantially parallel and one over the other.

In actual use, packets 2 are fed parallel to themselves along paths P1, P2, with walls 8 substantially perpendicular to direction A; and successive packets 2 in lines 10 are normally positioned contacting one another.

Device 1 also comprises a feed unit 12 for feeding packets 2 successively to drying beams 3, 3' at input station 4. Feed unit 12 comprises a known lift (not shown) for bringing the end packets 2 of a single line (not shown) of packets 2—extending horizontally upstream from input station 4, at a higher level than conveyor assembly 9' and at a lower level than conveyor assembly 9—individually and alternately onto a level with conveyor assemblies 9 and 9'.

Conveyor assemblies 9, 9' and other portions of device 1 at input station 4 and intermediate station 5 up- and downstream from conveyor assemblies 9, 9' operate in substantially the same way and are structurally substantially identical. For the sake of simplicity, therefore, only the structure and operation of conveyor assembly 9 and the portions of device 1 at input station 4 and intermediate station 5 up- and downstream from conveyor assembly 9 are described below; it being understood that, unless otherwise stated, the same description also applies to conveyor assembly 9' and the portions of device 1 at input station 4 and intermediate station 5 up- and downstream from conveyor assembly 9'.

With reference to FIGS. 2 to 8, feed unit 12 comprises a pusher 13 located upstream from conveyor assembly 9, and which pushes packets 2 successively and horizontally in direction A to conveyors 11.

Feed unit 12 also comprises a supporting member 14, on which packets 2 slide in use. More specifically, a line 15 of packets 2 is formed on supporting member 14, and is fed forward in steps by a back-and-forth movement of pusher 13 in direction A. When an end packet 2*a* in line 15 reaches or passes a given location D (FIG. 2), conveyors 11 grip packet 2*a*, which then becomes part of line 10. In other words, on reaching or passing given location D, packet 2*a* is fed forward in direction A by conveyors 11.

Device 1 also comprises a reject unit 16 for rejecting flawed packets 2, and which comprises a pusher 17 for removing flawed packets 2 from input station 4 by pushing the flawed packets 2, in a horizontal direction B crosswise to direction A, into an output chute 18. Reject unit 16 also comprises a detector 19 located at input station 4 to detect any flaws in packets 2. In further embodiments not shown, detector 19 may be located elsewhere, e.g. upstream from input station 4.

Device 1 also comprises a control unit 20, which is connected to transfer units 6, 6', to conveyor assemblies 9, 9', to detector 19, and to pusher 17, and which activates pusher 17 as a function of the findings of detector 19. Control unit 20 also regulates operation of conveyor assemblies 9, 9' to adjust the travelling speed V1 of lines 10 in direction A. More specifically, control unit 20 regulates the drives (not shown) of conveyors 9, 9' independently of each other.

With particular reference to FIGS. 2 to 7, when a packet 2 (in particular an incoming packet 2*b*) is rejected, a gap 21 (FIG. 3) is created by line 10 of packets 2 (in particular, packets 2*a* and 2*c*) moving forward in direction A, and by the stalling of line 15 of packets 2 (in particular, incoming packets 2*d*). At this point, control unit 20 reduces travelling speed V1, and further packets 2 (in particular, incoming packets 2*e*) are pushed forward by pusher 13 in direction A to close gap 21 (FIGS. 4 to 7). In other words, when the flawed incoming packet 2*b* is rejected, incoming packets 2*d* and 2*e* are fed forward in direction A faster than line 10.

A continuous line 10 is thus achieved, with the following advantages:

less risk of any relative movement between packets 2, and therefore of incorrect positioning and jamming of the packets;

less risk of gaps 21 continuing downstream from conveyor assembly 9;

better product tracing (i.e. identification of each packet 2 at each processing and/or marketing stage);

substantially the same pressure is exerted on walls 8 of all packets 2, thus reducing the risk of deformation of packets 2.

Figure 9:
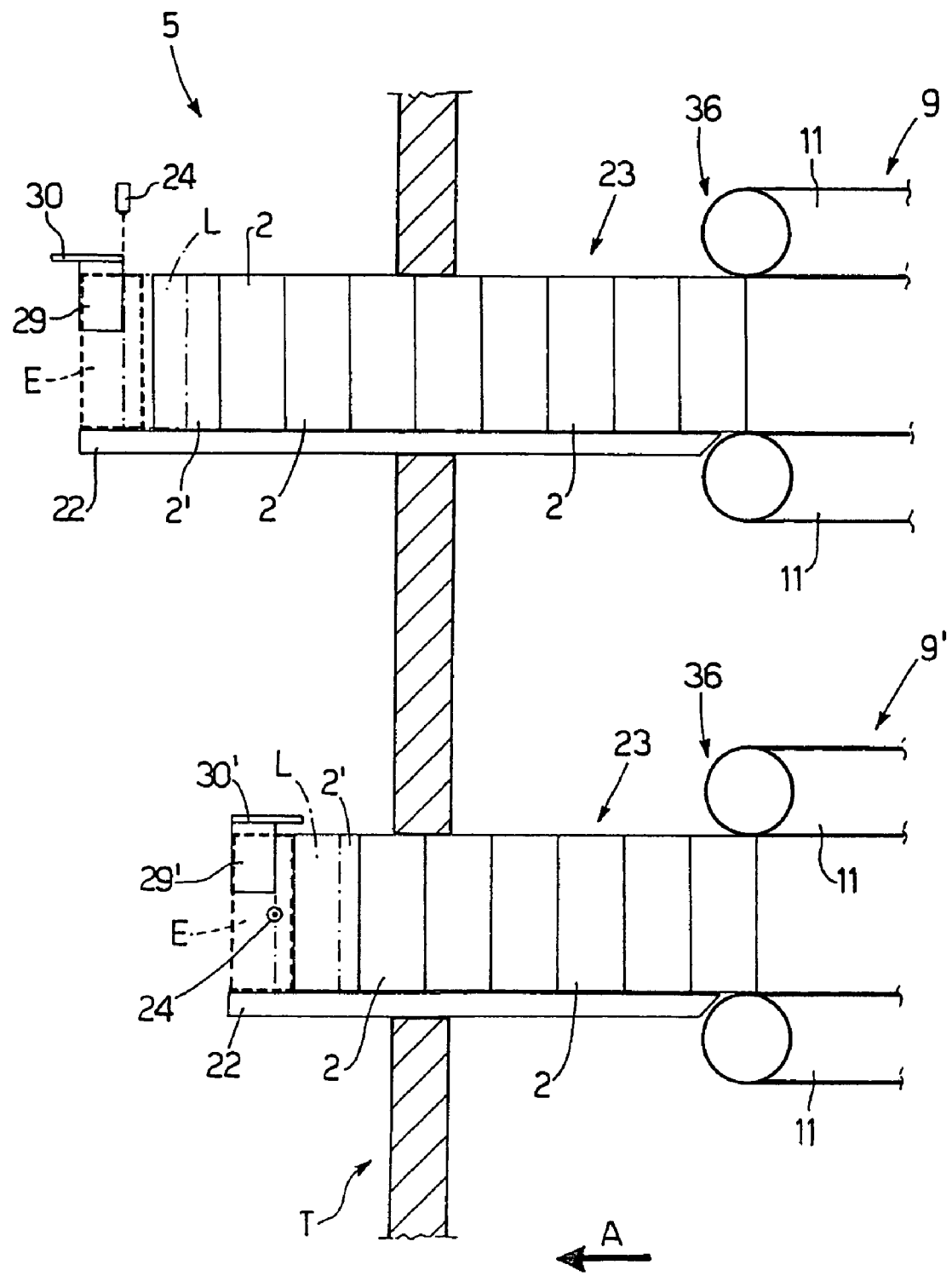
FIG. 9 shows a partly sectioned side view of a further detail of the FIG. 1 device.

With particular reference to FIG. 9, device 1 also comprises a support assembly 22 located at intermediate station 5, between conveyor assembly 9 and transfer unit 6, to support an orderly group 23 of packets 2 coming off conveyor assembly 9. More specifically, support assembly 22 has a slide surface, on which orderly group 23 travels, in use, in direction A to transfer unit 6.

Orderly group 23 comprises a number of packets 2 arranged in a line extending between conveyor assembly 9 and transfer unit 6; successive packets 2 in orderly group 23 are positioned contacting one another; and, in actual use, at the intermediate station, orderly group 23 is pushed in direction A to transfer unit 6 by line 10 travelling on conveyor assembly 9.

Device 1 also comprises a detector 24 located at intermediate station 5, connected to control unit 20, and for determining the location of an end packet 2 in orderly group 23. More specifically, detector 24 determines the presence of packet 2' at a given location L at intermediate station 5. Location L is located immediately upstream from an extraction location E, from which transfer unit 6 removes packet 2'.

Control unit 20 regulates operation of conveyor assembly 9 to adjust travelling speed V1 as a function of a machine angle of transfer unit 6 and the findings of detector 24. In actual use, when detection of packet 2' at location L precedes a reference machine angle of transfer unit 6, control unit 20 reduces travelling speed V1; and, conversely, when packet 2' is detected at location L after the reference machine angle of transfer unit 6, control unit 20 increases travelling speed V1.

More specifically, control unit 20 determines a time difference between the presence of packet 2' at location L and the reference machine angle, and compares it with a threshold difference.

In some embodiments: the variation in travelling speed V1 by control unit 20 is quantitatively independent of the time difference; the variation in travelling speed V1 is quantitatively dependent on the time difference; the variation in travelling speed V1 is spread over a number of operating cycles (i.e. over a number of transfer operations of packets 2' to extraction location E).

In a further embodiment, when a substantially constant time difference is detected, control unit 20 may be self-taught and adjust, for example, the reference machine angle.

It should be pointed out that, as opposed to a jam, removal of a packet 2 off conveyor assembly 9 (e.g. for quality control) normally simply results in a halt in the forward movement of orderly group 23, which, in the presence of a gap, is not pushed forward by line 10.

Device 1 also comprises an indicator unit 25 (FIG. 1) connected to control unit 20 to indicate the time difference to the operator. More specifically, the indicator unit comprises two green light elements (LEDs) 26, which light up in the presence of a relatively small time difference; two yellow luminous elements 27, which light up in the presence of a medium time difference; and two red light elements 28, which light up in the presence of a relatively large time difference.

Figure 10:
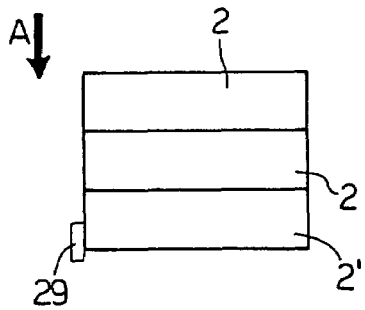
FIGS. 10 and 11 show top plan views, with parts removed for clarity, of the FIG. 9 detail.
Figure 11:
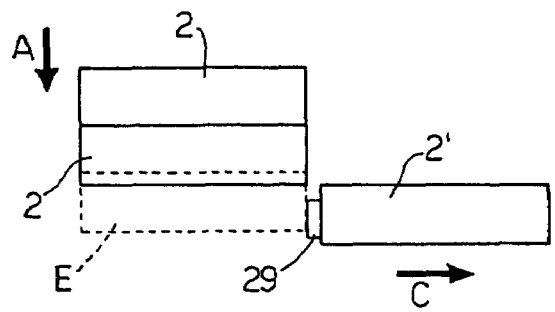
Figure 8:
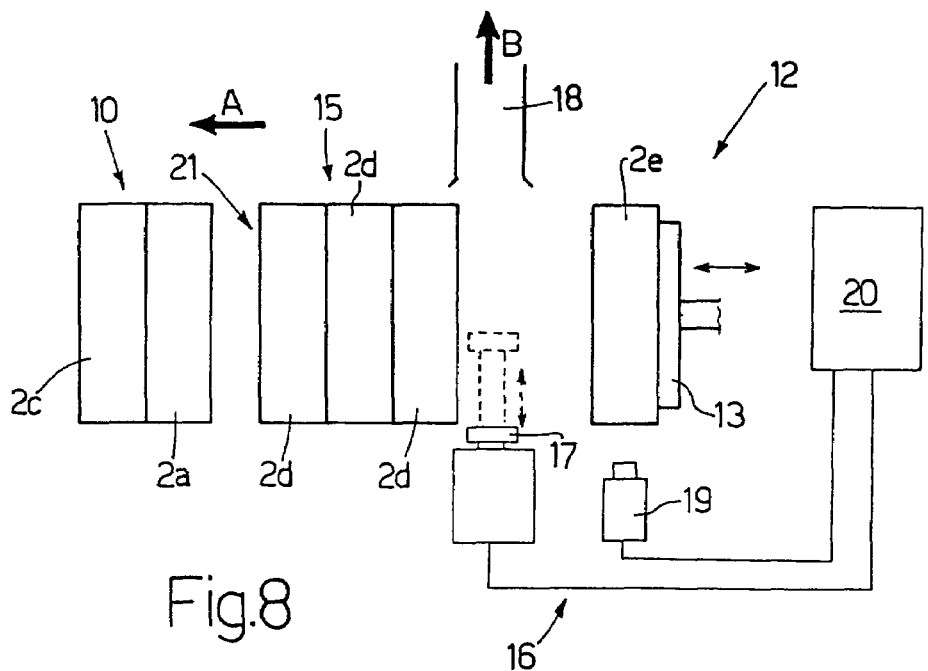
FIG. 8 shows a top plan view, with parts removed for clarity, of the FIG. 2-7 detail in the FIG. 3 operating position.

Transfer unit 6 comprises a number of ejector paddles 29 (FIGS. 1, 10, 11) fitted integrally to a belt 30 running about two idle pulleys 31 and a drive pulley 32. At each operating cycle, each paddle 29 removes a respective packet 2' from intermediate station 5 in a direction C crosswise to direction A, and pushes packet 2' along a given path P3 from intermediate station 5 to output conveyor 7.

Transfer unit 6 also comprises a channel (not shown) extending along path P3 and for guiding packet 2' along path P3.

Similarly, transfer unit 6' comprises a number of ejector paddles 29' fitted integrally to a belt 30' running about two idle pulleys 31' and pulley 32. At each operating cycle, each paddle 29' removes a respective packet 2' from intermediate station 5 in direction C, and pushes packet 2' along a given path P4 from intermediate station 5 to output conveyor 7.

Transfer unit 6' also comprises a channel (not shown) extending along path P4 and for guiding packet 2' along path P4.

Output conveyor 7 comprises a number of push paddles 33 fitted integrally to a belt 34 running about an idle pulley (not shown) and pulley 32.

It should be pointed out that paths P3 and P4 converge towards output conveyor 7, and transfer units 6, 6' and output conveyor 7 operate in phase (belts 30, 30' and 34 are all wound about the same pulley 32).

Detectors 24 are located with respect to transfer units 6, 6' (FIG. 9) so that, in use, detectors 24 detect the presence of packets 2' immediately upstream from and on a level with paddles 29, 29' at intermediate station 5.

The term "machine angle" as used herein is intended to mean a given point in the operating cycle, in which transfer unit 6 assumes a given operating configuration (in particular, the position of paddles 29) typical of that point. When transfer unit 6 operates at constant speed, identical machine angles of successive operating cycles follow one another at constant time intervals of the same duration as the operating cycle.

Device 1 also comprises an adjusting unit 35 for adjusting the distances between the output ends 36 of conveyor assemblies 9, 9' and relative extraction locations E. Adjusting unit 35 comprises a frame T, to which output conveyor 7 and transfer units 6, 6' (in particular, pulleys 31, 31', 32) are fitted integrally; and frame T is mounted to oscillate about an axis 37 by means of a hinge 38.

In actual use, an operator may adjust the distances between output ends 36 of conveyor assemblies 9, 9' and relative extraction locations E by rotating frame T about axis 37 and fixing frame T in the desired position by means of locking devices (not shown).

Device 1 also comprises a detector (encoder, not shown) connected to control unit 20 to ensure rotation of frame T actually corresponds to the desired adjustment in the distances between output ends 36 and relative extraction locations E.

More specifically, to switch over to a specific type of packet 2, control unit 20 indicates to the operator the adjustments to be made by means of an interface 39 (e.g. a screen and a keyboard and/or pushbutton panel and/or pointing device), and checks the correct adjustments have been made. The adjustments depend on the characteristics of the specific type of packet 2 (e.g. size and/or type of packing material).

Figure 12:
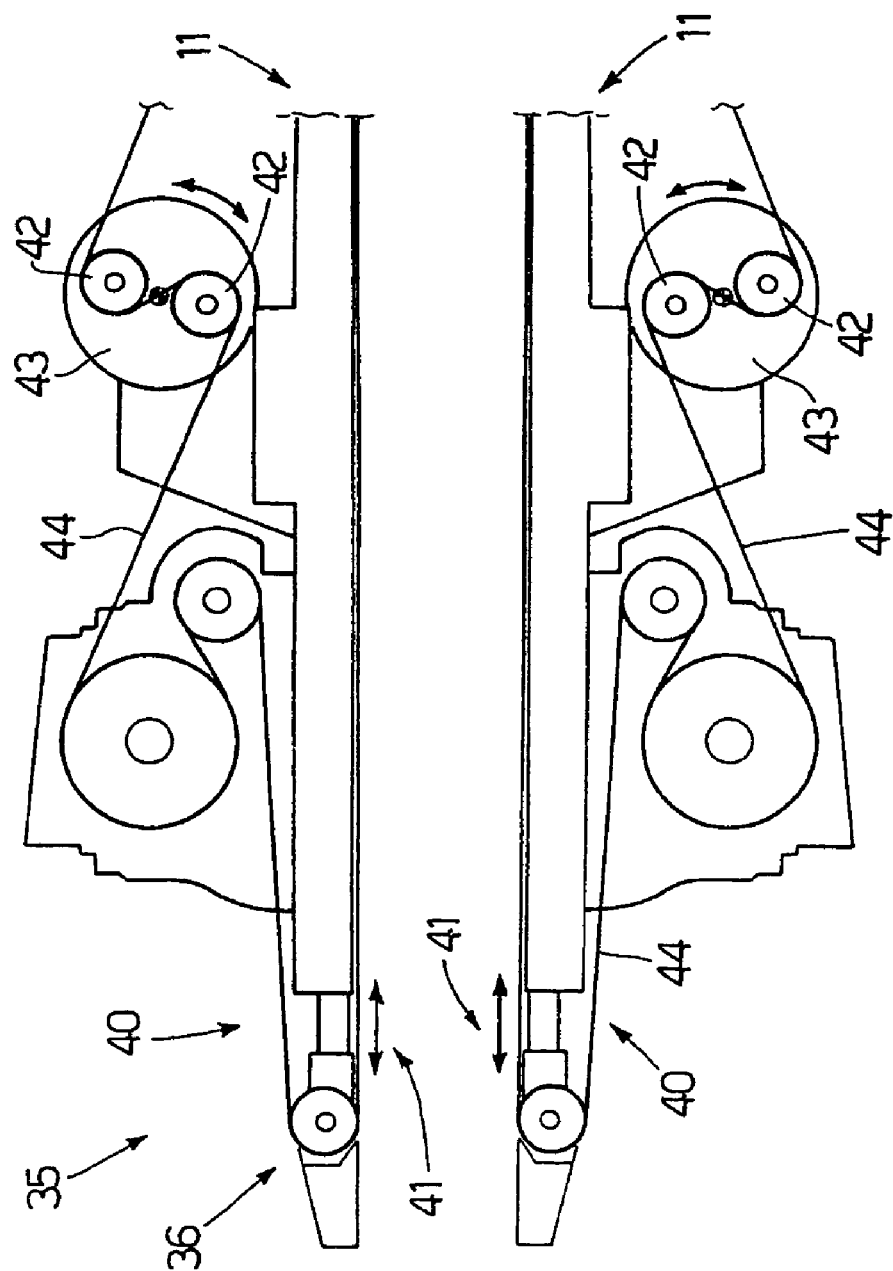
FIG. 12 shows a detail of FIG. 1 with certain parts highlighted.

Adjusting unit 35 also comprises an extension device 40 for extending a respective conveyor 11 towards respective extraction location E. By way of example, FIG. 12 shows one possible embodiment of respective end portions of two of conveyors 11, in which adjusting unit 35 comprises a worm and a pin (not shown) by which to extend a portion 41 of a respective conveyor 11. Each conveyor 11 also comprises two pulleys 42 fitted to a respective revolving platform 43; and a respective belt 44 running about pulleys 42. In actual use, when shortening or extending portions 41, platforms 43 are rotated to maintain a substantially constant tension of belts 44.

Device 1 also comprises a sensor 45 for determining the position of paddles 29', and which is used by control unit 20 to determine the machine angle of transfer units 6, 6', particularly when starting up device 1.

Device 1 is therefore extremely versatile, by adapting easily to different types of packets 2, and—extremely important—reduces the risk of jamming at intermediate station 5, caused by incorrect positioning of packet 2' at intermediate station 5 and, hence, poor coordination of transfer units 6, 6' and conveyor assemblies 9, 9'.

Though the above description refers to a device 1 comprising two drying beams 3, 3', the teachings of the present invention obviously also apply to devices comprising only one or more than two drying beams.

The teachings of the present invention obviously also apply to the manufacture of cartons of cigarettes, and to packages of other than cigarettes, such as food products, confectionary, or toiletries.

The invention claimed is:

1. A device for handling packets, the device (1) comprising at least one conveyor assembly (9; 9') for conveying at least one line (10) of packets (2) at a given travelling speed (V1) to an intermediate station (5); at least one transfer unit (6; 6'); and at least one support assembly (22) located at the intermediate station (5), between the conveyor assembly (9; 9') and the transfer unit (6; 6'), and which supports at least one packet (2') coming off the conveyor assembly (9; 9'); in actual use, said packet (2') being pushed, at the intermediate station (5), to the transfer unit (6; 6') by the line (10) of packets (2) conveyed by the conveyor assembly (9; 9'); the transfer unit (6; 6') transferring said packet (2') from an extraction location (E) at the intermediate station (5) to an output conveyor (7); and the device (1) being characterized by comprising a detector (24) for sensing the location of said packet (2') at the intermediate station (5); and a control unit (20) connected to the conveyor assembly (9; 9'), to the detector (24), and to the transfer unit (6; 6), and for controlling operation of the conveyor assembly (9; 9) to adjust the travelling speed (V1) of the line (10) of packets (2) to the intermediate station (5) as a function of a machine angle of the transfer unit (6; 6') and of the findings of the detector (24).

2. A device as claimed in claim 1, wherein the detector (24) detects the presence of said packet (2') in a given location (D) immediately upstream from the extraction location (E); the control unit (20) increasing the travelling speed (V1) when the presence of the packet (2') in the given location (D) is detected late with respect to a reference machine angle of the transfer unit (6; 6').

3. A device as claimed in claim 1, wherein the detector (24) detects the presence of said packet (2') in a given location (D) immediately upstream from the extraction location (E); the control unit (20) reducing the travelling speed (V1) when the presence of the packet (2') in the given location (D) is detected early with respect to a reference machine angle of the transfer unit (6; 6').

4. A device as claimed in claim 1, wherein the support assembly (22) has a slide surface, on which, in use, said packet (2') travels to the transfer unit (6; 6').

5. A device as claimed in claim 1, wherein the transfer unit (6; 6') removes said packet (2') in a first direction (C) from the intermediate station (5); the packet (2') travelling at the intermediate station (5) in a second direction (A) crosswise to the first direction (C).

6. A device as claimed in claim 5, wherein the conveyor assembly (9; 9') feeds said line (10) of packets (2) to the intermediate station (5) in said second direction (A).

7. A device as claimed in claim 1, wherein the transfer unit (6; 6') comprises a moving belt (30; 30'), and at least one paddle (29; 29') fitted integrally to the belt (30; 30'); the paddle (29; 29') pushing said packet (2') along a given path (P3; P4).

8. A device as claimed in claim 1, wherein the support assembly (22) supports an orderly group (23) of packets (2) coming off the conveyor assembly (9; 9') at the intermediate station (5).

9. A device as claimed in claim 8, wherein the orderly group (23) of packets (2) comprises a number of packets (2) arranged in a line extending between the conveyor assembly (9; 9') and the transfer unit (6; 6'); successive packets (2) in the orderly group (23) of packets (2) being arranged contacting one another; and the transfer unit (6; 6') removing said packet (2') in the orderly group (23) of packets (2) individually from the intermediate station (5).

10. A device as claimed in claim 1, wherein the conveyor assembly (9; 9'), which has an output end (36), feeds at least the line (10) of packets (2) to the intermediate station through the output end (36); the device (1) comprising at least one adjusting unit (35) for adjusting the distance between the output end (36) and the extraction location (E).

11. A device as claimed in claim 10, wherein the adjusting unit (35) comprises a frame (T), to which the transfer unit (6; 6') is fitted integrally; the frame (T) being mounted to oscillate about a given axis (37).

12. A device as claimed in claim 11, and comprising an angle detector to determine rotation of the frame (T) about the given axis (37).

13. A device as claimed in claim 12, wherein the control unit (20) compares rotation of the frame (T) with a reference value which is a function of the characteristics of the packets (2).

14. A device as claimed in claim 10, wherein the conveyor assembly (9; 9') comprises a belt conveyor (11; 11') of a given length; and the adjusting unit (35) comprises extension means (40) for extending the belt conveyor (11; 11') towards the extraction location (E).

15. A device as claimed in claim 14, wherein the adjusting unit (35) comprises a worm and a pin, which cooperate with each other to extend the belt conveyor (11; 11') towards the extraction location (E).

16. A device as claimed in claim 1, and comprising at least one further conveyor assembly (9') defined substantially in the same way as said conveyor assembly (9); and at least one further transfer unit (6') defined in the same way as said transfer unit (6); the transfer unit (6) and the further transfer unit (6') being connected in phase to each other; and operation of the conveyor assembly (9) and operation of the further conveyor assembly (9') being regulated independently of each other by the control unit (20).

17. A device as claimed in claim 16, wherein the transfer unit (6) and the further transfer unit (6') each transfer the respective said packet (2') along a relative given path (P3, P4) from the extraction location (E) to the output conveyor (7); the given paths (P3, P4) converging with each other.

18. A device as claimed in claim 16, wherein the conveyor assembly (9) and the further conveyor assembly (9') each feed the respective line (10) of packets (2) along a relative feed path (P1; P2); the feed paths (P1; P2) being substantially parallel to each other.

19. A device for handling packets, the device (1) comprising at least one conveyor assembly (9; 9'), which has an output end (36) and feeds at least one line (10) of packets (2) to an intermediate station (5) through the output end (36); at least one transfer unit (6; 6'); and at least one support assembly (22) located at the intermediate station (5), between the conveyor assembly (9; 9') and the transfer unit (6; 6'), and which supports at least one packet (2') coming off the conveyor assembly (9; 9'); in actual use, said packet (2'), as it travels to the transfer unit (6; 6'), being supported by the support assembly (22) and pushed by the line (10) of packets (2) conveyed by the conveyor assembly (9; 9'); the transfer unit (6; 6') transferring the packet (2') from an extraction location (E) at the intermediate station (5) to an output conveyor (7); and the device (1) being characterized by comprising at least one adjusting unit (35) for adjusting the distance between the output end (36) and the extraction location (E).

20. A device as claimed in claim 19, wherein the adjusting unit (35) comprises a frame (T), to which the transfer unit (6; 6') is fitted integrally; the frame (T) being mounted to oscillate about a given axis (37).

21. A device as claimed in claim 20, and comprising an angle detector to determine rotation of the frame (T) about the given axis (37).

22. A device as claimed in claim 21, and comprising a control unit (20) for comparing measured rotation of the frame (T) with a reference value which is a function of the characteristics of the packets (2).

23. A device as claimed in claim 19, wherein the conveyor assembly (9; 9') comprises a belt conveyor (11; 11') of a given length; and the adjusting unit (35) comprises extension means (40) for extending the belt conveyor (11; 11') towards the extraction location (E).

24. A device as claimed in claim 23, wherein the adjusting unit (35) comprises a worm and a pin, which cooperate with each other to extend the belt conveyor (11; 11') towards the extraction location (E).

25. A device as claimed in claim 19, wherein the support assembly (22) has a slide surface, on which, in use, said packet (2') travels to the transfer unit (6; 6').

26. A device as claimed in claim 19, wherein the transfer unit (6; 6') removes said packet (2') in a first direction (C) from the intermediate station; the packet (2') travelling at the intermediate station (5) in a second direction (A) crosswise to the first direction (C).

27. A device as claimed in claim 26, wherein the conveyor assembly (9; 9') feeds said line (10) of packets (2) to the intermediate station (5) in said second direction (A).

28. A device as claimed in claim 19, wherein the transfer unit (6; 6') comprises a moving belt (30; 30'), and at least one paddle (29; 29') fitted integrally to the belt (30; 30'); the paddle (29; 29') pushing said packet (2') along a given path (P3; P4) from the extraction location (E) to the output conveyor (7).

29. A device as claimed in claim 19, wherein the support assembly (22) supports an orderly group (23) of packets (2) coming off the conveyor assembly (9; 9') at the intermediate station (5).

30. A device as claimed in claim 19, wherein the orderly group (23) of packets (2) comprises a number of packets (2) arranged in a line extending between the conveyor assembly (9; 9') and the output conveyor (7); successive packets (2) in the orderly group (23) of packets (2) being arranged contacting one another; and the transfer unit (6; 6') removing said packet (2') individually from the orderly group (23) of packets (2).

31. A device as claimed in claim 19, and comprising at least one further conveyor assembly (9') defined substantially in the same way as said conveyor assembly (9); and at least one further transfer unit (6') defined in the same way as said transfer unit (6); the transfer unit (6) and the further transfer unit (6') being connected in phase to each other; and operation of the conveyor assembly (9) and operation of the further conveyor assembly (9') being regulated independently of each other by the control unit (20).

32. A device as claimed in claim 31, wherein the transfer unit (6) and the further transfer unit (6') each transfer the respective said packet (2') along a relative given path (P3; P4) from the extraction location to the output conveyor; the given paths (P3; P4) converging with each other.

33. A device as claimed in claim 31, wherein the conveyor assembly (9) and the further conveyor assembly (9') each feed the respective line (10) of packets (2) along a relative feed path (P1, P2); the feed paths (P1, P2) being substantially parallel to each other.

34. A device for handling packets, the device (1) comprising at least one conveyor assembly (9; 9') for conveying at least one line (10) of packets (2) at a given travelling speed (V1) in a first direction (A); and at least one feed unit (12) for feeding a succession of incoming packets (2d, 2e, 2b) to the conveyor assembly (9; 9) in the first direction (A) at an input station (4); in actual use, the incoming packets (2d, 2e, 2b), once fed to the conveyor assembly (9; 9'), form part of the line (10) of packets (2); and the device (1) being characterized by comprising a reject unit (16) for rejecting flawed incoming packets (2b) at the input station (4); and a control unit (20) connected to the conveyor assembly (9; 9') to regulate operation of the conveyor assembly (9; 9') so that, in use, in the event of rejection of a flawed incoming packet (2d; 2e; 2b), the travelling speed (V1) is reduced, and the incoming packets (2d, 2e, 2b) are fed faster in the first direction than the line (10) of packets (2).

35. A device as claimed in claim 34, wherein the reject unit (16) removes the flawed packets (2b) in a second direction (B) crosswise to the first direction (A).

36. A device as claimed in claim 34, wherein the reject unit (16) comprises a first pusher (17) for pushing the flawed packets (2b) in a second direction (B) crosswise to the first direction (A).

37. A device as claimed in claim 34, wherein the feed unit (12) comprises a second pusher (13) for feeding the incoming packets (2d, 2e, 2b) in said first direction (A).

* * * * *

UNITED STATES PATENT AND TRADEMARK OFFICE
CERTIFICATE OF CORRECTION

PATENT NO. : 7,475,769 B2
APPLICATION NO. : 11/488088
DATED : January 13, 2009
INVENTOR(S) : Stefano Bovina and Alessandro Minarelli It is certified that error appears in the above-identified patent and that said Letters Patent is hereby corrected as shown below:

Title page, item [73] Assignee: should read as follows:   G.D Societa' Per Azioni, Bologna (IT)

Signed and Sealed this

Twenty-fourth Day of February, 2009

JOHN DOLL
*Acting Director of the United States Patent and Trademark Office*